United States Patent
Liu

(10) Patent No.: US 9,462,505 B2
(45) Date of Patent: Oct. 4, 2016

(54) MAC HEADER COMPRESSION IN LONG-RANGE WIRELESS LOCAL AREA NETWORKS

(71) Applicant: MARVELL WORLD TRADE LTD., St. Michael (BB)

(72) Inventor: Yong Liu, Campbell, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 15/077,605

(22) Filed: Mar. 22, 2016

(65) Prior Publication Data

US 2016/0205588 A1 Jul. 14, 2016

Related U.S. Application Data

(62) Division of application No. 13/751,446, filed on Jan. 28, 2013, now Pat. No. 9,300,767.

(60) Provisional application No. 61/593,034, filed on Jan. 31, 2012.

(51) Int. Cl.
| | |
|---|---|
| *H04W 28/06* | (2009.01) |
| *H04L 29/06* | (2006.01) |
| *H04W 8/18* | (2009.01) |
| *H04W 52/02* | (2009.01) |

(52) U.S. Cl.
CPC .......... *H04W 28/06* (2013.01); *H04L 65/1096* (2013.01); *H04L 65/4076* (2013.01); *H04W 8/186* (2013.01); *H04W 52/0229* (2013.01)

(58) Field of Classification Search
CPC ....................... H04W 8/186; H04L 2012/6416
See application file for complete search history.

(56) References Cited

U.S. PATENT DOCUMENTS

| | | | |
|---|---|---|---|
| 8,315,197 B2* | 11/2012 | Finn .................. | H04W 4/16 370/312 |
| 8,526,351 B2 | 9/2013 | Fischer et al. | |
| 8,724,720 B2 | 5/2014 | Srinivasa et al. | |
| 9,125,105 B2* | 9/2015 | Kwon ................. | H04W 28/16 |
| 9,300,767 B2 | 3/2016 | Liu | |
| 2009/0196163 A1 | 8/2009 | Du | |
| 2010/0265864 A1* | 10/2010 | He ...................... | H04W 68/025 370/311 |
| 2010/0265869 A1* | 10/2010 | Sarikaya ............. | H04L 12/1836 370/312 |

(Continued)

FOREIGN PATENT DOCUMENTS

| | | |
|---|---|---|
| EP | 2161953 A2 | 3/2010 |
| WO | WO-2012/122119 A1 | 9/2012 |

OTHER PUBLICATIONS

Lv Kaiying et al., "MAC Header Design for Small Data Packet for 802.11ah", IEEE 802.11-12/0094r2, Jan. 18, 2012, 11 pages.

(Continued)

*Primary Examiner* — Omer S Mian

(57) ABSTRACT

A wireless network interface device receives a packet, wherein the packet includes (i) a set of one or more flag bits, and (ii) a medium access control (MAC) header, and the MAC header contains at least (i) a first address field specifying a receiver address, and (ii) a second address field specifying a transmitter address. The wireless network interface device processes the packet to determine whether the packet is a multicast packet. When it is determined that the packet is a multicast packet, the wireless network interface device processes a third address field in the MAC header to determine a MAC multicast address for the packet.

16 Claims, 5 Drawing Sheets

(56) References Cited

U.S. PATENT DOCUMENTS

| | | | |
|---|---|---|---|
| 2011/0002219 | A1 | 1/2011 | Kim et al. |
| 2012/0063335 | A1* | 3/2012 | Cho ..................... H04W 8/186 370/252 |
| 2012/0087300 | A1* | 4/2012 | Seok .................... H04W 76/02 370/315 |
| 2012/0163292 | A1* | 6/2012 | Kneckt ............. H04W 52/0229 370/328 |
| 2012/0230178 | A1 | 9/2012 | Wang et al. |
| 2012/0307826 | A1* | 12/2012 | Matsuoka ............... H04L 49/70 370/390 |
| 2013/0128808 | A1 | 5/2013 | Wentink et al. |
| 2013/0128809 | A1 | 5/2013 | Wentink et al. |

OTHER PUBLICATIONS

International Search Report and Written Opinion in International Application No. PCT/US2013/023374 dated Apr. 19, 2013.

International Preliminary Report on Patentability in International Application No. PCT/US2013/023374, 7 pages (Aug. 14, 2014).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

de Vegt, "Potential Compromise for 802.11ah Use Case Document", Institute of Electrical and Electronics Engineers, doc. No. IEEE 802.11-11/0457r0, pp. 1-27 (Mar. 2011).

Park, "Proposed Specification Framework for TGah", The Institute of Electrical and Electronics Engineers, doc. No. IEEE 802.11-11/1137r6, pp. 1-13 (Mar. 2012).

Park, "Proposed Specification Framework for TGah D9.x", The Institute of Electrical and Electronics Engineers, doc. No. IEEE 802.11-yy/xxxxr0, pp. 1-30 (Jul. 2012).

Park, "Proposed Specification Framework for TGah", The Institute of Electrical and Electronics Engineers, doc. No. IEEE 802.11-11/1137r11, pp. 1-36 (Sep. 2012).

Park, "Specification Framework for TGah," The Institute of Electrical and Electronics Engineers, doc. No. IEEE 802.11-11/1137r13, pp. 1-58 (Jan. 14, 2013).

Shao, "Channel Selection for 802.11ah," doc.: IEEE 802.11-12/0816r0, pp. 1-11 (Jul. 2012).

Taghavi et al., "Introductory Submission for TGah", doc. No. IEEE 802.11-11/0062r0, Institute for Electrical and Electronics Engineers, pp. 1-5 (Jan. 14, 2011).

Vermani et al. "Spec Framework Text for PHY Numerology," The Institute of Electrical and ElectronicsEngineers, doc. No. IEEE 802.11-11/1311r0, pp. 1-5 (Sep. 2011).

Vermani et al. "Preamble Format for 1 MHz," The Institute of Electrical and Electronics Engineers, doc. No. IEEE 802.11-11/1482r2, pp. 1-30 (Nov. 2011).

Yu et al., "Coverage extension for IEEE802.11ah," The Institute of Electrical and Electronics Engineers, doc. No. IEEE 802.11-11/0035r1, pp. 1-10 (Jan. 2011).

Zhang et al., "11ah Data Transmission Flow," The Institute of Electrical and Electronics Engineers, doc. No. IEEE 802.11-11/1484r1, pp. 1-15 (Nov. 2011).

Zhang et al., "1 MHz Waveform in Wider BW ", The Institute of Electrical and Electronics Engineers, doc. No. IEEE 802.11-12/0309r1, pp. 1-10 (Mar. 2012).

Zhang et al., "Beamforming Feedback for Single Stream," The Institute of Electrical and Electronics Engineers, doc. No. IEEE 802.11-12/1312r0, pp. 1-22 (Nov. 12, 2012).

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-359 (Jan. 2012).

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-363 (Mar. 2012).

IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-385 (Jun. 2012).

IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-408 (Oct. 2012).

IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-440 (Jan. 2013).

Chen, "Home Network Basis: Transmission Environments and Wired/Wireless Protocols," Prentice Hall, pp. 1-26 (Jul. 2003).

Hiertz et al., "The IEEE 802.11 Universe," IEEE Communications Magazine, pp. 62-70, (Jan. 2010).

Park, "Proposed Specification Framework for TGah", The Institute of Electrical and Electronics Engineers, doc. No. IEEE 802.11--yy/xxxxr05, (Jan. 2012).

Park et al., "Low Power Capability Support for 802.11ah," doc. No. IEEE 802.11-11/0060r1, The Institute for Electrical and Electronics Engineers, 7 pages (Jan. 17, 2011).

Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, Institute for Electrical and Electronics Engineers, pp. 1-49, (Jan. 18, 2011).

* cited by examiner

MAC HEADER COMPRESSION IN LONG-RANGE WIRELESS LOCAL AREA NETWORKS

CROSS-REFERENCES TO RELATED APPLICATIONS

This disclosure is a divisional of U.S. application Ser. No. 13/751,446, now U.S. Pat. No. 9,300,767, entitled "MAC Header Compression in Long-Range Wireless Area Networks," filed Jan. 28, 2013, which claims the benefit of U.S. Provisional Patent Application No. 61/593,034, entitled "802.11ah MAC Header Compression," filed on Jan. 31, 2012, the disclosures of both of which are incorporated herein by reference in their entireties.

FIELD OF THE DISCLOSURE

The present disclosure relates generally to communication networks and, more particularly, to long range low power wireless local area networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range.

Work has begun on a new standard, IEEE 802.11ah, which will specify wireless network operation in sub-1 GHz frequencies. Low frequency communication channels are generally characterized by better propagation qualities and extended propagation ranges compared to transmission at higher frequencies. In the past, sub-1 GHz ranges have not been utilized for wireless communication networks because such frequencies were reserved for other applications (e.g., licensed TV frequency bands, radio frequency band, etc.). There are few frequency bands in the sub-1 GHz range that remain unlicensed, with different specific unlicensed frequencies in different geographical regions. The IEEE 802.11 ah Standard will specify wireless operation in available unlicensed sub-1 GHz frequency bands.

SUMMARY

In one embodiment, a method includes receiving, at or from a station (STA), a plurality of packets. Each packet of the plurality of packets includes (i) a set of one or more flag bits, and (ii) a medium access control (MAC) header. Each MAC header contains at least (i) a first address field specifying a receiver address, and (ii) a second address field specifying a transmitter address. The method also includes determining whether each set of one or more flag bits indicates that the STA was associated with an access point (AP) when the respective packet was generated, and processing the MAC header of each packet of the plurality of packets. Processing the MAC header of each packet includes processing a third address field in each packet for which it is determined that the respective set of one or more flag bits indicates that the STA was not associated with an AP when the respective packet was generated. The third address field contains a MAC address of the STA.

The above embodiment may provide certain advantages. In some scenarios, for example, the above embodiment reduces the amount of overhead information in the MAC header of a packet. Moreover, the above embodiment allows a reduction in the amount of overhead information even in scenarios where a transmitting STA or a receiving STA has not yet been associated with an AP.

In another embodiment, an apparatus includes a network interface configured to receive, from a STA, a plurality of packets. Each packet of the plurality of packets includes (i) a set of one or more flag bits, and (ii) a MAC header. Each MAC header contains at least (i) a first address field specifying a receiver address, and (ii) a second address field specifying a transmitter address. The network interface is also configured to determine whether each set of one or more flag bits indicates that the STA was associated with an AP when the respective packet was generated, and process the MAC header of each packet of the plurality of packets. The network interface is configured to process the MAC header of each packet at least in part by processing a third address field in each packet for which it is determined that the respective set of one or more flag bits indicates that the STA was not associated with an AP when the respective packet was generated. The third address field contains a MAC address of the STA.

The above embodiment may provide certain advantages. In some scenarios, for example, the above embodiment reduces the amount of overhead information in the MAC header of a packet. Moreover, the above embodiment allows a reduction in the amount of overhead information even in scenarios where a transmitting STA or a receiving STA has not yet been associated with an AP.

In another embodiment, a method includes receiving a plurality of packets, wherein each packet of the plurality of packets includes (i) a set of one or more flag bits, and (ii) a MAC header. Each MAC header contains at least (i) a first address field specifying a receiver address, and (ii) a second address field specifying a transmitter address. The method also includes determining whether each set of one or more flag bits indicates that the respective packet is a multicast packet, and processing the MAC header of each packet of the plurality of packets. Processing the MAC header of each packet includes processing a third address field in each packet for which it is determined that the respective set of one or more flag bits indicates that the respective packet is a multicast packet. The third address field contains a MAC multicast address.

The above embodiment may provide certain advantages. In some scenarios, for example, the above embodiment reduces the amount of overhead information in the MAC header of a packet. Moreover, the above embodiment allows a reduction in the amount of overhead information even in communication systems where multicast AIDs are not available (e.g., in systems where multicast AIDs are not defined under the communication protocol of the system).

In another embodiment, an apparatus includes a network interface configured to receive a plurality of packets. Each packet of the plurality of packets includes (i) a set of one or more flag bits, and (ii) a MAC header. Each MAC header contains at least (i) a first address field specifying a receiver address, and (ii) a second address field specifying a transmitter address. The network interface is also configured to determine whether each set of one or more flag bits indicates that the respective packet is a multicast packet, and process the MAC header of each packet of the plurality of packets. The network interface is configured to process the MAC header of each packet at least in part by processing a third address field in each packet for which it is determined that the set of one or more flag bits indicates that the respective packet is a multicast packet. The third address field contains a MAC multicast address.

The above embodiment may provide certain advantages. In some scenarios, for example, the above embodiment reduces the amount of overhead information in the MAC header of a packet. Moreover, the above embodiment allows a reduction in the amount of overhead information even in communication systems where multicast AIDs are not available (e.g., in systems where multicast AIDs are not defined under the communication protocol of the system).

In yet another embodiment, a method includes receiving, at a wireless network interface device, a packet, wherein the packet includes (i) a set of one or more flag bits, and (ii) a medium access control (MAC) header, and the MAC header contains at least (i) a first address field specifying a receiver address, and (ii) a second address field specifying a transmitter address. The method also includes processing, at the wireless network interface device, the packet to determine whether the packet is a multicast packet, and when the wireless network interface device determines that the packet is a multicast packet, processing, at the wireless network interface device, a third address field in the MAC header to determine a MAC multicast address for the packet.

In still another embodiment, an apparatus comprises a wireless network interface device having one or more integrated circuits. The one or more integrated circuits are configured to receive a packet, wherein the packet includes (i) a set of one or more flag bits, and (ii) a medium access control (MAC) header, and the MAC header contains at least (i) a first address field specifying a receiver address, and (ii) a second address field specifying a transmitter address. The one or more integrated circuits are also configured to process the packet to determine whether the packet is a multicast packet, and when the wireless network interface device determines that the packet is a multicast packet, process a third address field in the MAC header to determine a MAC multicast address for the packet.

DETAILED DESCRIPTION

In embodiments described below, a wireless network device such as an access point (AP) of a wireless local area network (WLAN) transmits data streams to one or more client stations (or "STAs," using IEEE 802.11 terminology). The AP is configured to operate with client stations according to at least a first communication protocol. The first communication protocol defines operation in a sub-1 GHz frequency range, and is typically used for applications requiring long range wireless communication with relatively low data rates. The first communication protocol (e.g., IEEE 802.11ah) is referred to herein as a "long range" communication protocol. In some embodiments, the long range communication protocol is used in sensor network applications, where power efficiency is of particularly high importance.

Packets conforming to a long range communication protocol include a physical layer (PHY) header and PHY payload, with the PHY payload including a medium access control (MAC) header and a MAC payload, in an embodiment. As in the MAC header defined by the IEEE 802.11 Standard, the MAC header in packets conforming to the long range communication protocol includes a first address field that specifies an address of the device receiving the packet (e.g., a client station or AP), and a second address field that specifies an address of the device transmitting the packet (e.g., an AP or client station). Whereas the IEEE 802.11 Standard specifies a MAC header with at least a third address field, however, the MAC header in packets conforming to the long range communication protocol does not necessarily include a third address field as discussed in greater detail in association with embodiments described below. Moreover, in various embodiments and scenarios, the types of addresses included in the first address field, the second address field, and/or (when present) the third address field are modified, as compared to the IEEE 802.11 Standard, in order to reduce the byte count of the MAC header for packets conforming to the long range communication protocol. Reducing the MAC header byte count serves to reduce packet overhead, and therefore improves power efficiency.

Figure 1:
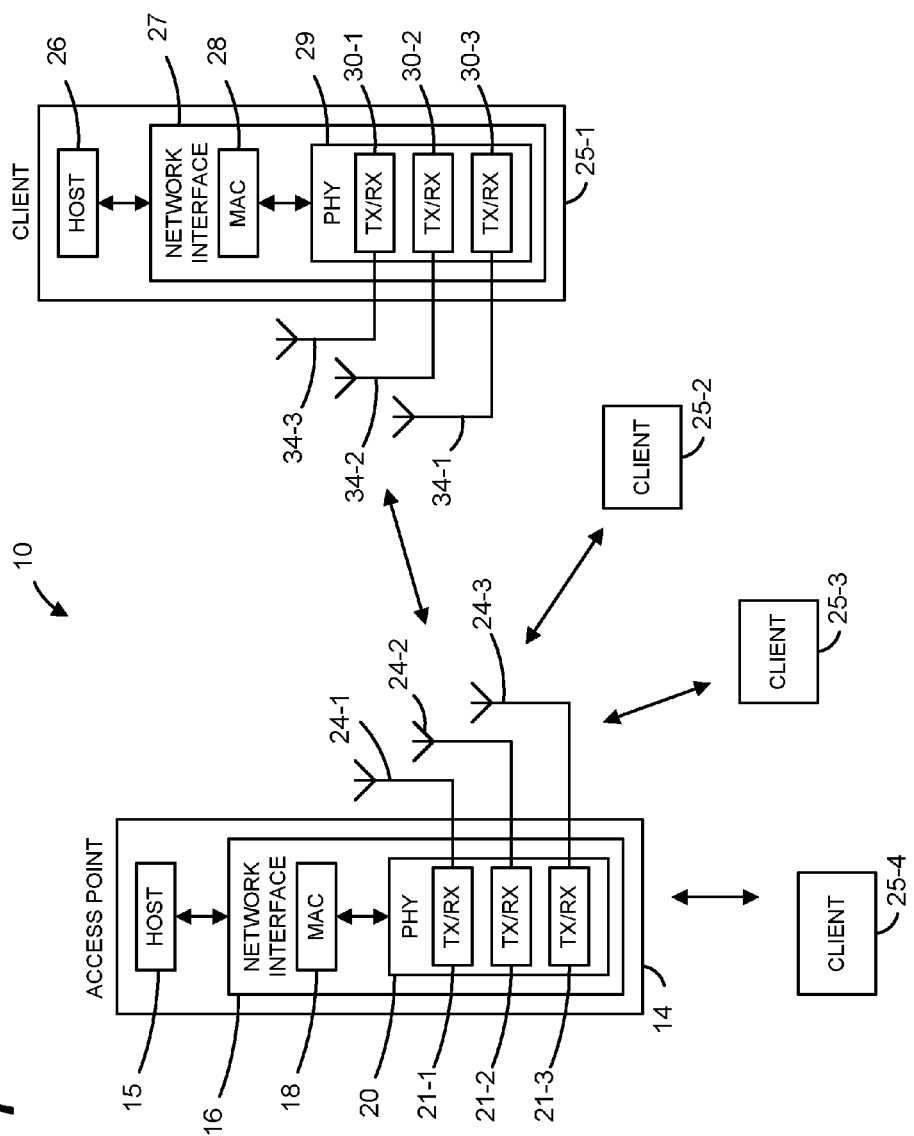
FIG. 1 is a block diagram of an example wireless local area network (WLAN), according to an embodiment.

FIG. 1 is a block diagram of an example WLAN 10 including an AP 14, according to an embodiment. The AP 14 includes a host processor 15 coupled to a network interface 16. The network interface 16 includes a MAC processing unit 18 and a PHY processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments.

The WLAN 10 further includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In some embodiments, one, some, or all of the client stations 25-2, 25-3, and 25-4 has/have a structure the same as or similar to the client station 25-1. In these embodiments, the client stations 25 that are structured the same as or similar to the client station 25-1 have the same or a different number of transceivers and antennas. For example, the client station 25-2 has only two transceivers and two antennas (not shown), according to an embodiment.

In an embodiment, the PHY processing unit 20 of the AP 14 is configured to generate packets conforming to the long range communication protocol, and the transceiver(s) 21 is/are configured to transmit the generated packets via the antenna(s) 24. Moreover, the PHY processing unit 20 of the AP 14 is configured to process received packets conforming to the long range communication protocol, in an embodiment. The packets are received by the transceiver(s) 21 via the antenna(s) 24.

In an embodiment, the PHY processing unit 29 of the client device 25-1 is also configured to generate packets conforming to the long range communication protocol, and the transceiver(s) 30 is/are configured to transmit the generated packets via the antenna(s) 34. Moreover, the PHY processing unit 29 of the client device 25-1 is configured to process received packets conforming to the long range communication protocol, in an embodiment. The packets are received by the transceiver(s) 30 via the antenna(s) 34.

In one embodiment and scenario (e.g., in an "infrastructure mode"), the AP 14 and one or more of the client stations 25 are configured to operate within a basic service set (BSS) set up by the AP 14. In particular, the AP 14 specifies the BSS band to be used for communications, designates a "primary" channel within the BSS band, and assigns an association identifier (AID) to each client station 25 joining the BSS, in an embodiment. In an embodiment, the AP 14 is associated with a MAC address that identifies the BSS (the "BSSID"), and each of the client stations 25 that has joined the BSS is associated with both a respective AID assigned by the AP 14 and a respective MAC address. In one embodiment, each MAC address is six bytes long, while each AID is only two bytes long.

In other scenarios (e.g., in an "ad hoc mode"), in an embodiment, two of more of the client stations 25 can directly communicate with each other, without the aid of the AP 14 (which may be absent from WLAN 10, or powered down, etc.). In the ad hoc mode, one of the client stations 25 (e.g., client station 25-1) assumes certain responsibilities of the AP 14, such as during the beaconing process, in an embodiment.

Figure 2:
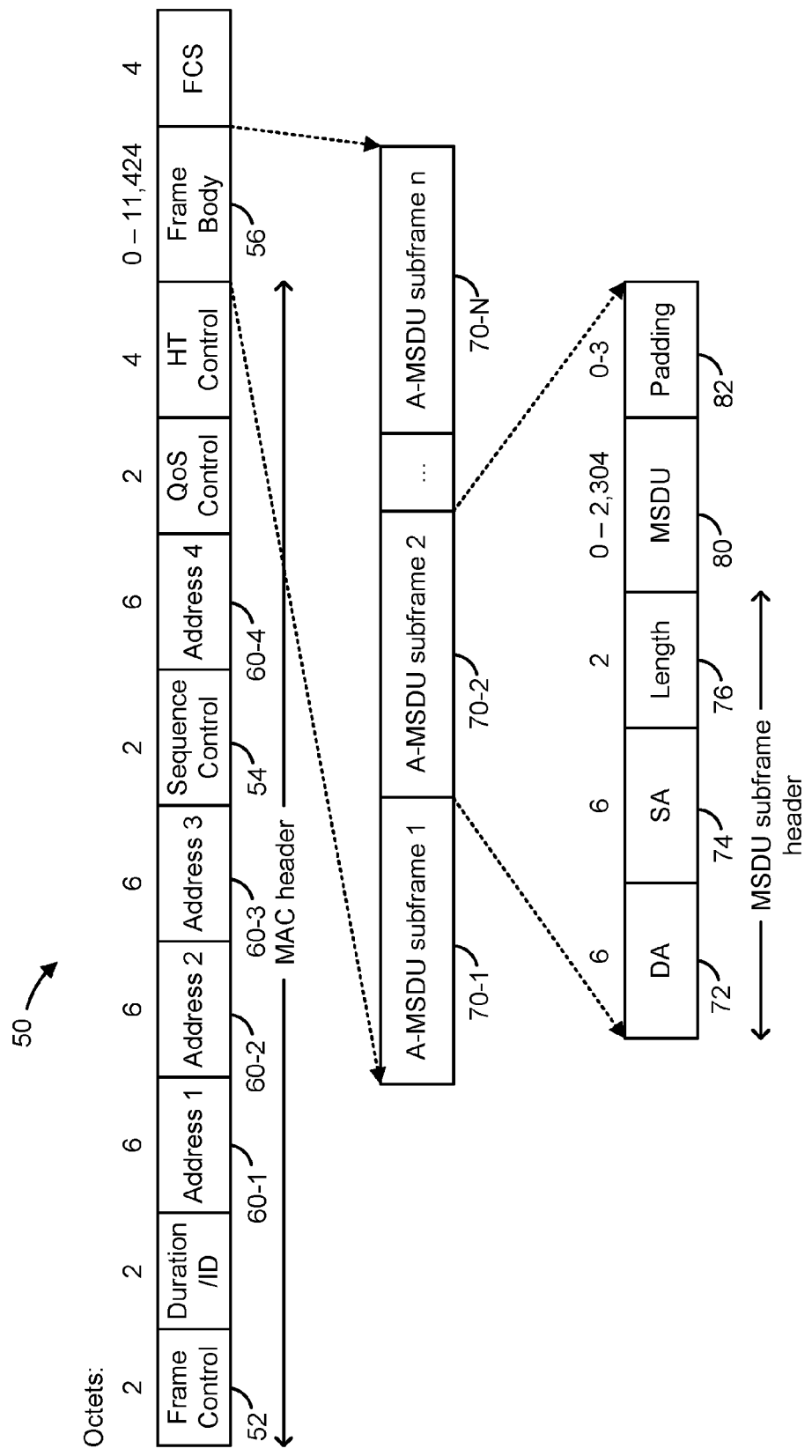
FIG. 2 is a diagram of an IEEE 802.11 medium access control (MAC) frame.

FIG. 2 is a diagram of an IEEE 802.11 MAC frame 50. The MAC frame 50 includes a MAC header with various fields, including a frame control field 52 containing control information (e.g., information indicating to a receiving device how the MAC frame 50 should be processed), and a sequence control field 54 indicating the number of the MAC frame 50 within a sequence of MAC frames and the fragment number of the MAC frame 50 within a sequence of MAC frame fragments. The latter number is useful for scenarios in which the MAC frame 50 represents a single fragment of a fragmented frame. In addition, the header of the MAC frame 50 includes various address fields 60. Under the IEEE 802.11 Standard, the first address field 60-1 specifies a six-byte MAC address of a device receiving the MAC frame 50, the second address field 60-2 specifies a six-byte MAC address of a device transmitting the MAC frame 50, the third address field 60-3 specifies a six-byte MAC network address, and the fourth address field 60-4 is only included in the header of MAC frame 50 in some scenarios. In relay or mesh network transmission scenarios, the third address field 60-3 is a six-byte MAC address of the final destination of the MAC frame 50, and the fourth address field 60-4 is a six-byte MAC address of the original source of the MAC frame 50. The contents of the four address fields 60-1 through 60-4 under the IEEE 802.11 Standard is described in more detail below.

The MAC frame 50 also includes a frame body 56, or MAC payload. For increased efficiency, the IEEE 802.11 Standard supports an aggregation mode in which multiple aggregated MAC service data units (A-MSDUs) are combined within a single MAC payload. In FIG. 2, this scenario is shown for the case of N A-MSDUs 70-1 through 70-N within frame body 56. Each of the A-MSDUs 70-1 through 70-N has a format similar to that shown in FIG. 2 for A-MSDU 70-2. In particular, the A-MSDU 70-2 includes a header with a destination address (DA) field 72, a source address (SA) field 74, and a length field 76. The DA field 72 is a MAC address of the final destination of the A-MSDU 70-2, and the SA field 74 is the original source of the A-MSDU 70-2. The A-MSDU 70-2 also includes an MSDU 80 and, in some cases, padding bits 82.

Table 1 below shows the contents of the various address fields 60 of the MAC frame 50, under the prior art IEEE 802.11 Standard, for different usage scenarios:

TABLE 1

(prior art)

|  |  |  |  | Address 3 | | Address 4 | |
|---|---|---|---|---|---|---|---|
| To DS | From DS | Address 1 | Address 2 | MSDU case | A-MSDU case | MSDU case | A-MSDU case |
| 0 | 0 | RA = DA | TA = SA | BSSID | BSSID | N/A | N/A |
| 0 | 1 | RA = DA | TA = BSSID | SA | BSSID | N/A | N/A |
| 1 | 0 | RA = BSSID | TA = SA | DA | BSSID | N/A | N/A |
| 1 | 1 | RA | TA | DA | BSSID | SA | BSSID |

"ToDS" and "FromDS" are the values of bits included in the frame control field 52 of the header of the MAC frame 50. ToDS is set equal to 1 when the MAC frame 50 is destined for the distribution system (i.e., uplink transmissions), and FromDS is set equal to 1 when the MAC frame 50 is being sent from the distribution system (i.e., downlink transmissions). A ToDS/FromDS value of 00 corresponds to a direct, STA-to-STA transmission of the packet including MAC frame 50, a ToDS/FromDS value of 01 corresponds to a transmission from an AP to a STA, a ToDS/FromDS value of 10 corresponds to a transmission from a STA to an AP, and a ToDS/FromDS value of 11 corresponds to a relay or mesh transmission.

In each ToDS/FromDS usage scenario, the first address field 60-1 specifies a six-byte MAC address of the receiver (AP or STA), and the second address field 60-2 specifies a six-byte MAC address of the transmitter (AP or STA). As indicated in Table 1, the receiver address is the same as the destination address for the STA-to-STA and AP-to-STA scenarios, and the transmitter address is the same as the source address for the STA-to-STA and STA-to-AP scenarios.

In scenarios in which a packet that does not contain A-MSDUs is originated from a MAC address other than the transmitter MAC address, and/or is destined for a MAC address other than the receiver MAC address, the third address field 60-3 specifies the destination MAC address or source MAC address. Specifically, the third address field 60-3 specifies the source MAC address when the packet is sent from an AP to a STA, and specifies the destination MAC address when the packet is sent from a STA to an AP. For the mesh network case, the third address field 60-3 specifies the destination MAC address, and the fourth address field 60-4 specifies the source MAC address, when the packet does not include A-MSDUs. For STA-to-STA communications, the third address field 60-3 specifies the identification of the network to which the STAs belong (i.e., the BSSID), when the packet does not include A-MSDUs.

As seen in FIG. 2, each A-MSDU 70 includes both a destination MAC address 72 and a source MAC address 74. Thus, there is no need for the third address field 60-3 or the fourth address field 60-4 to specify the source and/or destination MAC address for A-MSDU usage scenarios. Instead, the third address field 60-3 specifies the BSSID for all four A-MSDU usage scenarios shown in Table 1. Similarly, the fourth address field 60-4 specifies the BSSID for the A-MSDU, mesh network scenario. As with the non-aggregated case, the fourth address field 60-4 is omitted for the other usage scenarios.

Notably, the IEEE 802.11 Standard described above utilizes at least three address fields (60-1 through 60-3 in the MAC frame 50) for all usage scenarios, with only the fourth address field 60-4 being omitted in some cases. Moreover, each of the address fields 60-1 through 60-3 (and 60-4, when present) specifies a six-byte MAC address, which causes the address fields 60 to collectively occupy a large portion (18 to 24 bytes) of the header of the MAC frame 50.

For some usage scenarios, the IEEE 802.11 approach of Table 1 includes more address bytes than are useful. For example, in the non-aggregated, STA-to-STA usage scenario, the BSSID specified in the third address field 60-3 is not useful. Moreover, the BSSID specified in the third address field 60-3 (and, if present, the BSSID specified in the fourth address field 60-4) for all of the aggregated usage scenarios is generally not useful. Further, six-byte MAC addresses are not always needed in systems where STAs are assigned two-byte AIDs, because an AID can be used in conjunction with a BSSID, or other MAC address, to uniquely identify a particular STA.

Accordingly, the various address fields 60-1 through 60-4 are redefined from the IEEE 802.11 Standard in order to compress the MAC header for higher efficiency in a long range communication protocol, in various embodiments. In some embodiments, the long range communication protocol defines a MAC frame the same or similar in structure to the MAC frame 50 of FIG. 2. In other embodiments, the MAC frame of the long range communication protocol fields that are different than the fields of MAC frame 50, and/or are arranged in a different order than shown in FIG. 2. For ease of explanation, however, various embodiments of the long range communication protocol will be described with reference to MAC frame 50. Moreover, various usage scenarios are described with reference to an embodiment in which communications occur within WLAN 10 of FIG. 1.

Table 2 below shows the contents of the various address fields 60 in the header of MAC frame 50 for different usage scenarios, according to one embodiment of the long range communication protocol:

TABLE 2

| To DS | From DS | Address 1 | Address 2 | Address 3 |
|---|---|---|---|---|
| 0 | 0 | RA | TA = AID | N/A |
| 0 | 1 | RA = AID | TA = BSSID | SA (optional) |
| 1 | 0 | RA = BSSID | TA = AID | DA (optional) |

In an embodiment, ToDS and FromDS are the values of bits included in the frame control field 52 of the header of the MAC frame 50, and indicate usage scenarios similar to those described above in connection with Table 1 (e.g., a ToDS/FromDS value of 00 corresponding to a direct, STA-to-STA transmission, etc.). As in the IEEE 802.11 Standard approach, the first address field 60-1 specifies the receiver address and the second address field 60-2 specifies the transmitter address. As seen in Table 2, however, a shorter, two-byte AID is used instead of a six-byte MAC address to identify a transmitting or receiving STA, in certain usage scenarios of this embodiment.

In a STA-to-STA usage scenario (ToDS/FromDS=00), the first address field 60-1 specifies the MAC address of the receiving STA (e.g., client station 25-1), the second address field 60-2 specifies the AID of the transmitting STA (e.g., client station 25-2), and the third address field 60-3 is omitted from the header of the MAC frame 50, such that the MAC header includes only eight address bytes.

In an AP-to-STA downlink usage scenario (ToDS/FromDS=01), the first address field 60-1 specifies the AID of the receiving STA (e.g., client station 25-1), and the second address field 60-2 specifies the MAC address (BSSID) of the transmitting AP (e.g., AP 14). In some embodiments and/or scenarios, the third address field 60-3 includes the MAC address of the source of the packet including MAC frame 50, such that the MAC header includes only 14 address bytes. In other embodiments and/or scenarios, the third address field 60-3 is omitted from the header of the MAC frame 50, such that the MAC header includes only eight address bytes.

In a STA-to-AP uplink usage scenario (ToDS/FromDS=10), the first address field 60-1 specifies the MAC address (BSSID) of the receiving AP (e.g., AP 14), and the second address field 60-2 specifies the AID of the transmitting STA (e.g., client station 25-1). In some embodiments and/or scenarios, the third address field 60-3 includes the MAC address of the destination of the packet including MAC frame 50, such that the MAC header includes only 14 address bytes. In other embodiments and/or scenarios, the third address field 60-3 is omitted from the header of the MAC frame 50, such that the MAC header includes only eight address bytes.

An AID of a STA does not uniquely identify the STA on a global level, and ambiguity may result when STAs of nearby BSSs have the same AID. Other address fields within the MAC header, however, can be used to resolve any such ambiguity. For example, in one embodiment, client station 25-1, if receiving a packet from AP 14 that includes the AID of client station 25-1 in the first address field 60-1, can confirm that the packet is intended for client station 25-1 by determining that the BSSID in the second address field 60-2 is the BSSID associated with AP 14 (i.e., the BSSID of the BSS to which the client station 25-1 is joined).

Nonetheless, without any enhancements or modifications, the approach of Table 2 can give rise to various problems. For example, an AID of a STA may not be available, making it impossible to include the AID in the first address field 60-1

(for the ToDS/FromDS=01 case), or in the second address field 60-2 (for the ToDS/FromDS=00 or 10 case). This can occur when a STA has not yet associated with the AP, for example, or when a multicast/group address is required (in embodiments where the long range communication protocol does not define AIDs for multicast/group addresses). Another potential problem may arise in embodiments where an encryption technique that calculates a counter mode with CBC-MAC protocol (CCMP) nonce, similar to encryption under the IEEE 802.11 Standard, is utilized for the long range communication protocol. Under the IEEE 802.11 Standard, for example, calculation of the CCMP nonce utilizes a six-byte transmitter MAC address from the second address field of the MAC header. As seen in Table 2, however, the second address field 60-2 instead includes a two-byte transmitter AID in certain usage scenarios. As a result, a receiving STA could be forced to utilize time and resources to convert transmitter AIDs to transmitter MAC addresses before CCMP decapsulation.

The approach of Table 2 can also give rise to problems in AP forwarding usage scenarios. Because other networks (e.g., an internet network coupled to an AP) do not recognize AIDs, the AP could be forced to utilize time and resources to convert transmitter AIDs to MAC source addresses, and/or convert MAC destination addresses to receiver AIDs, before sending out the frame.

Yet another potential issue with the approach of Table 2 may arise in connection with relay and mesh transmission usage scenarios. In particular, the approach of Table 2, without any modifications, may not be easily extended to support a four-address structure similar to that shown in the MAC frame format 50 of FIG. 2. As described above in connection with FIG. 1, a four-address structure may be useful for relay and mesh transmissions where source and destination addresses are needed in addition to transmitter and receiver addresses.

Still another issue with the approach of Table 2 may arise in embodiments where an AP is permitted to change the AID of a STA from an old value to a new value. In particular, the approach of Table 2 may, without modification or enhancement, result in frame addressing errors when an old AID of a STA is changed to a new AID.

The enhancements and/or modifications described with reference to Tables 3-6 below address some or all of the above issues. In particular, the embodiments of Tables 3-5 provide enhancements to the basic approach of Table 2 (i.e. utilizing AIDs rather than MAC addresses in some scenarios), while the embodiment of Table 6 provides a simpler, alternative approach that avoids some or all of the above issues at the expense of efficiency (i.e., additional bytes in the MAC header).

Table 3 below shows the contents of the various address fields 60 in the header of the MAC frame 50 for different usage scenarios, according to one embodiment of the long range communication protocol:

TABLE 3

| To DS | From DS | ViaAP | Address 1 | Address 2 | Address 3 MSDU case | Address 3 A-MSDU case | Address 4 MSDU case | Address 4 A-MSDU case |
|---|---|---|---|---|---|---|---|---|
| 0 | 0 | 0 | RA = DA | TA = SA (AID) | N/A | N/A | N/A | N/A |
| 0 | 1 | 0 | RA = DA (AID) | TA = BSSID | N/A | N/A | N/A | N/A |
| 0 | 1 | 1 | RA = DA (AID) | TA = BSSID | SA | N/A | N/A | N/A |
| 1 | 0 | 0 | RA = BSSID | TA = SA (AID) | N/A | N/A | N/A | N/A |
| 1 | 0 | 1 | RA = BSSID | TA = SA (AID) | DA | N/A | N/A | N/A |
| 1 | 1 | 1 | RA | TA | DA | N/A | SA | N/A |

In one embodiment, ToDS and FromDS are the values of bits included in the frame control field 52 of the header of the MAC frame 50, and indicate usage scenarios similar to those described above with reference to Table 1 (e.g., a ToDS/FromDS value of 00 corresponding to a direct, STA-to-STA transmission, etc.). An additional bit, "ViaAP," is also included in the frame control field 52, in an embodiment. In the embodiment of Table 3, ViaAP is equal to 1 if the corresponding packet travels through an AP that is neither the original source nor the final destination of the packet, and equals 0 otherwise. In other embodiments, the ViaAP bit, and/or the ToDS and FromDS bits, are instead included in another suitable field of the MAC header, or another location within the packet but outside of the MAC header.

In a STA-to-STA usage scenario (ToDS/FromDS/ViaAP=000), the first address field 60-1 specifies the MAC address of the receiving STA (e.g., client station 25-1), the second address field 60-2 specifies the AID of the transmitting STA (e.g., client station 25-2), and the third address field 60-3 and fourth address field 60-4 are omitted from the header of the MAC frame 50, such that the MAC header includes only eight address bytes.

In two AP-to-STA usage scenarios (ToDS/FromDS/ViaAP=010 and ToDS/FromDS/ViaAP=011), the first address field 60-1 specifies the AID of the receiving STA (e.g., client station 25-1), and the second address field 60-2 specifies the MAC address (BSSID) of the transmitting AP (e.g., AP 14). In the embodiment of Table 3, the third address field 60-3 is omitted from the MAC header if ToDS/FromDS/ViaAP=010 (such that the MAC header includes only eight address bytes), but includes the MAC source address if ToDS/FromDS/ViaAP=011 (such that the MAC header includes only 14 address bytes).

In two STA-to-AP usage scenarios (ToDS/FromDS/ViaAP=100 and ToDS/FromDS/ViaAP=101), the first address field 60-1 specifies the MAC address (BSSID) of the receiving AP (e.g., AP 14), and the second address field 60-2 specifies the AID of the transmitting STA (e.g., client station 25-1). In the embodiment of Table 3, the third address field 60-3 is omitted from the MAC header if ToDS/FromDS/ViaAP=100 (such that the MAC header includes only eight address bytes), but includes the MAC destination address if ToDS/FromDS/ViaAP=101 (such that the MAC header includes only 14 address bytes).

In a relay or mesh network transmission scenario (ToDS/FromDS/ViaAP=111), the first address field 60-1 specifies the MAC address of the receiving mesh STA (e.g., AP 14), the second address field 60-2 specifies the MAC address of the transmitting mesh STA (e.g., an AP other than AP 14), the third address field 60-3 specifies the MAC destination address, and the fourth address field 60-4 specifies the MAC source address.

Thus, as in both the IEEE 802.11 Standard and the embodiment of Table 2, the first address field 60-1 specifies the receiver address and the second address field 60-2 specifies the transmitter address. As seen in Table 3, however, this embodiment does not utilize a third or fourth address field when the frame body 56 includes A-MSDUs 70, regardless of the usage scenario (uplink, downlink, etc.). In one embodiment, one or more special combinations of ToDS, FromDS, ViaAP and/or other flag bits are used to indicate to a receiving device that a packet includes A-MSDUs 70 in the MAC frame body 56, and therefore does not include a third address field or a fourth address field in the header of the MAC frame 50. In various embodiments, for example, a ToDS/FromDS/ViaAP value of 000 in a packet sent by an AP, and/or a ToDS/FromDS/ViaAP value of 110 in a packet sent to an AP, can be used to indicate that the MAC frame body 56 of a packet includes A-MSDUs 70 and thus only two address fields.

Moreover, in one embodiment, the third address field 60-3 is defined differently for usage scenarios in which a set of flag bits (e.g., a particular ToDS/FromDS/ViaAP combination) indicates that a STA has not yet been associated with the AP, and therefore does not yet have an assigned AID. In some embodiments, for example, the third address field 60-3 is always present in the MAC header when a STA transmitting or receiving the device is not associated with an AP. In one such embodiment, the third address field 60-3 specifies the MAC destination address when the receiving device is an unassociated STA, and specifies the MAC source address when the transmitting device is an unassociated STA. In one embodiment, one or more special combinations of ToDS, FromDS, ViaAP and/or other flag bits is/are used to indicate to a receiving device that a packet includes A-MSDUs in the MAC frame body 56, and therefore does not include a third or fourth address field in the header of the MAC frame 50, in an embodiment. In various embodiments, for example, a ToDS/FromDS/ViaAP value of 011 (or 101, or another suitable, reserved combination) in a packet sent by an AP is used to indicate that the third address field 60-3 is the MAC address of the destination/receiving STA, and/or a ToDS/FromDS/ViaAP value of 101 (or 011, or another suitable, reserved combination) in a packet sent to an AP is used to indicate that the third address field 60-3 is the MAC address of the source/transmitting STA. In an embodiment, any address field 60 that normally contains an AID of a STA according to Table 3 (e.g., the first address field 60-1 or second address field 60-2) is instead set to a reserved value not assigned to any STA (e.g., all ones, or all zeros, etc.) when an AID has not yet been assigned to the STA.

Figure 3:
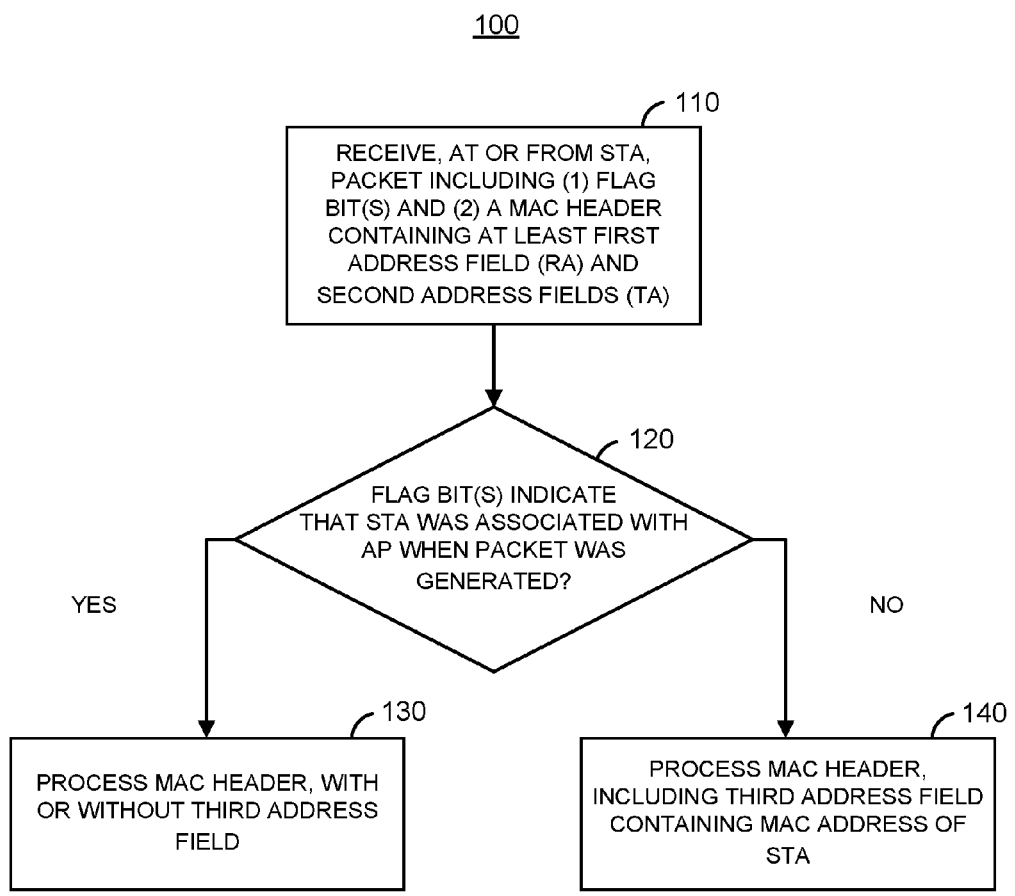
FIG. 3 is a flow diagram of an example method for interpreting address information in a received packet, according to an embodiment.

FIG. 3 is a flow diagram of an example method 100 for interpreting address information in a received packet, according to an embodiment in which the MAC header address fields are defined in a manner similar to that shown in Table 3. In an embodiment, the method 100 is repeated for each packet of a plurality of packets.

At block 110, a packet is received at or from a STA, such as client station 25-1 in FIG. 1. In one embodiment and scenario where the packet is received at a STA, the method 100 is implemented by the network interface 27 of the client station 25-1 in FIG. 1. In various embodiments and/or scenarios where the packet is received from a STA, the method 100 is implemented by a network interface (similar to network interface 27) of client station 25-2 in FIG. 1, or by the network interface 16 of AP 14 in FIG. 1. The packet includes a set of one or more flag bits and a MAC header. In one embodiment, the set of flag bits is included within the frame control field 52 of MAC frame 50 in FIG. 2, and/or at a different suitable location within MAC frame 50, or elsewhere in the packet that includes MAC frame 50. The flag bits include ToDS, FromDS, and ViaAP bits, in an embodiment. The MAC header includes at least a first address field specifying a receiver address and a second address field specifying a transmitter address (e.g., address fields 60-1 and 60-2, respectively, in the header of MAC frame 50 in FIG. 2). In an embodiment, the first address field and the second address field contain address information according to the embodiment of Table 3, above.

At block 120, it is determined whether the flag bit(s) indicate that the STA (i.e., the STA at, or from which, the packet was received at block 110), was associated with an AP when the packet was generated.

If it is determined at block 120 that the STA was associated with an AP (e.g., had an assigned AID) when the packet was generated, flow proceeds to block 130. At block 130, the MAC header of the packet received at block 110 is processed, where the processing of the MAC header either includes or does not include processing of a third address field depending on other factors or flag indications. In one embodiment, for example, either two, three or four address fields are processed at block 130 depending on the usage scenario (e.g., according to Table 3 above, in an embodiment).

In one embodiment, and in a scenario in which the packet is received at a STA (at block 110), the processing at block 130 includes processing an AID of the STA that is located in the first address field of the MAC header. Similarly, in an embodiment, and in a scenario in which the packet is received from a STA (at block 110), the processing at block 130 includes processing an AID of the STA that is located in the second address field of the MAC header.

In one embodiment, processing the AID of the STA at block 130 includes both determining a six-byte MAC address of the STA based on the two-byte AID of the STA, and then calculating a CCMP nonce based on the determined MAC address of the STA. Alternatively, in an embodiment, processing the AID of the STA at block 130 includes calculating a CCMP nonce based on a receiver MAC address included in the first address field of the MAC header. In yet another embodiment, processing the AID of the STA at block 130 includes calculating a CCMP nonce based on the AID of the STA augmented by additional bits (e.g., padding bits, a partial BSSID, and/or another suitable set of bits, in various different embodiments).

If it is determined at block 120 that the STA was not associated with an AP when the packet was generated (e.g., did not have an assigned AID), flow proceeds to block 140. At block 140, the MAC header of the packet received at block 110, including at least a third address field that contains the MAC address of the STA (e.g., the third address field 60-3 in the header of MAC frame 50 in FIG. 2), is processed. In one embodiment, for example, a receiving device implementing the method 100 parses the third address field at block 140 in order to determine the MAC address of the STA for one or more purposes (e.g., to confirm that the receiving device is the intended recipient of the packet, etc.). In some embodiments and/or scenarios, the first address field and/or second address field are also processed at block 140.

In some embodiments, the method 100 includes additional blocks not seen in FIG. 3. In one embodiment, for example, the packet received at block 110 does not contain a third address field if the packet includes A-MSDUs. In this embodiment, the method 100 also includes a block in which it is determined whether the set of one or more flag bits indicates that the packet includes A-MSDUs. In one such embodiment, processing the MAC header (e.g., at block 130) does not include processing a third address field if it is determined that the set of flag bits indicates that the packet includes A-MSDUs.

By including a STA MAC address in a third address field as needed, the example embodiments of Table 3 and/or FIG. 3 may resolve some of the issues discussed above that arise with STAs for which no AID is currently assigned. Another embodiment addresses the issues discussed above concerning the lack of AIDs for multicast/group addresses. Table 4 shows the contents of the various address fields 60 in the header of the MAC frame 50 for different usage scenarios, according to one such embodiment of the long range communication protocol:

TABLE 4

| To DS | From DS | ViaAP | Address 1 | Address 2 | Address 3 | Address 4 |
|---|---|---|---|---|---|---|
| 0 | 0 | 1 | RA = DA (MC address) | TA = SA (AID) | BSSID | N/A |
| 0 | 1 | 1 | RA = DA (MC AID) | TA = SA | DA(MC address) | N/A |
| 0 | 1 | 0 | RA = DA (MC AID) | TA = BSSID | DA(MC address) | N/A |
| 1 | 0 | 1 | RA = BSSID | TA = SA (AID) | DA (MC address) | N/A |
| 1 | 1 | 0 | RA = DA (MC AID) | TA | DA(MC address) | SA |

In one embodiment, ToDS, FromDS, and ViaAP are the values of bits included in the frame control field 52 of the header of the MAC frame 50, similar to the embodiment of Table 3 above. In other embodiments, the ToDS, FromDS, and/or ViaAP bits are instead included in another suitable field of the MAC header, or another location within the packet but outside of the MAC header. In each of the usage scenarios shown in Table 4, the destination address for the packet containing the MAC frame 50 is a multicast/group address. In some embodiments, the embodiment of Table 4 is combined with the embodiment of Table 3. For example, in one embodiment, ToDS, FromDS, ViaAP and/or other flag bits indicate whether the packet is not a multicast packet, in which case address fields are defined according to the different usage scenarios of Table 3, or is a multicast packet, in which case address fields are defined according to the different usage scenarios of Table 4.

In a STA-to-STAs multicast usage scenario (ToDS/FromDS/ViaAP=001), the first address field 60-1 specifies the destination MAC multicast address (e.g., a group address for client stations 25-2 through 25-4), the second address field 60-2 specifies the AID of the transmitting STA (e.g., client station 25-1), the third address field 60-3 specifies the BSSID of the BSS to which the transmitting and/or receiving STAs belong, and the fourth address field 60-4 is omitted from the header of the MAC frame 50.

In one AP-to-STAs multicast usage scenario (ToDS/FromDS/ViaAP=011) and embodiment, the first address field 60-1, which would be populated with the multicast AID if such an AID were defined, is instead set to a value that indicates a broadcast frame (e.g., all zeros or all ones), the second address field 60-2 specifies the MAC source address, the third address field 60-3 specifies the destination MAC multicast address, and the fourth address field 60-4 is omitted from the header of the MAC frame 50.

In another AP-to-STAs multicast usage scenario (ToDS/FromDS/ViaAP=010), the first address field 60-1, which would be populated with the multicast AID if such an AID were defined, is instead set to a value that indicates a broadcast frame (e.g., all zeros or all ones), the second address field 60-2 specifies the MAC address (BSSID) of the AP (e.g., AP 14), the third address field 60-3 specifies the destination MAC multicast address, and the fourth address field 60-4 is omitted from the header of the MAC frame 50.

In a STA-to-AP multicast usage scenario (ToDS/FromDS/ViaAP=101), the first address field 60-1 specifies the MAC address (BSSID) of the receiving AP (e.g., AP 14), the second address field 60-2 specifies the AID of the transmitting STA (e.g., client station 25-1), the third address field 60-3 specifies the destination MAC multicast address, and the fourth address field 60-4 is omitted from the header of the MAC frame 50.

In a relay or mesh network transmission multicast scenario (ToDS/FromDS/ViaAP=110), the first address field 60-1, which would be populated with the multicast AID if such an AID were defined, is instead set to a value that indicates a broadcast frame (e.g., all zeros or all ones), the second address field 60-2 specifies the MAC address of the transmitting device, the third address field 60-3 specifies the destination MAC multicast address, and the fourth address field 60-4 specifies the MAC source address.

Figure 4:
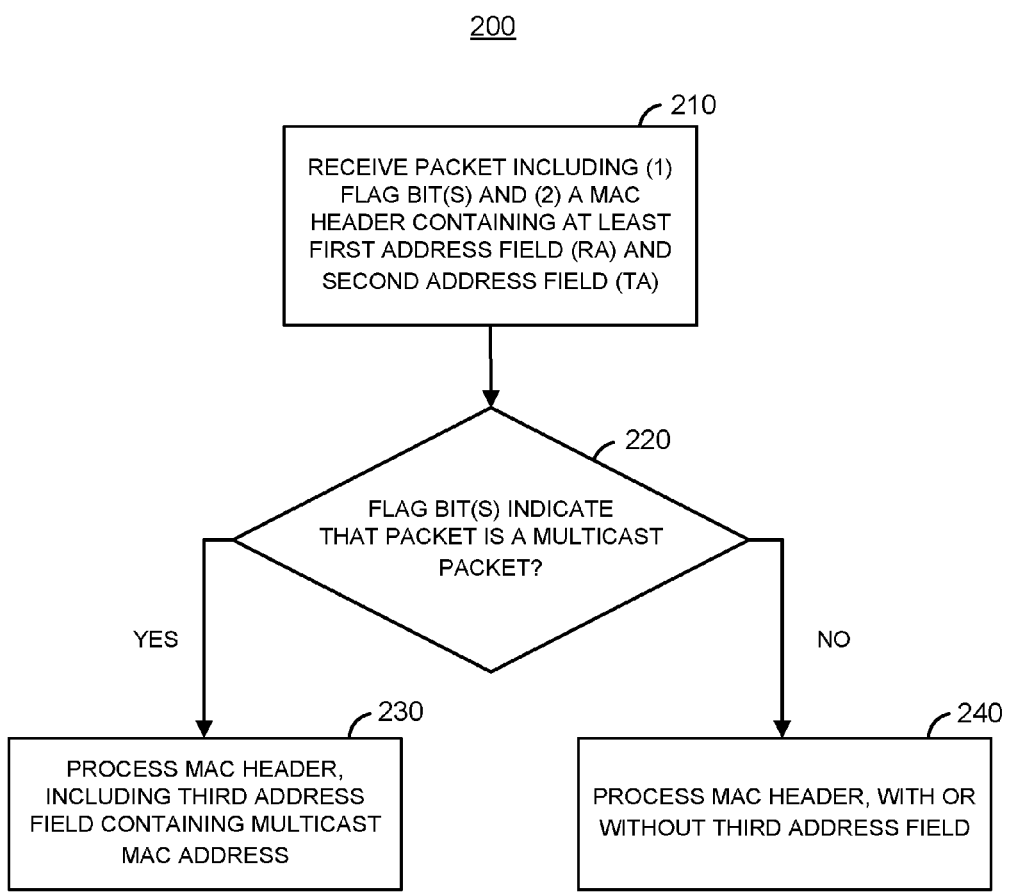
FIG. 4 is a flow diagram of another example method for interpreting address information in a received packet, according to an embodiment.

FIG. 4 is a flow diagram of an example method 200 for interpreting address information in a received packet, according to an embodiment in which the MAC header address fields are defined in a manner similar to that shown in Table 4. In various embodiments and scenarios, the method 200 is implemented by the network interface 27 of the client station 25-1 or the network interface 16 of AP 14 in FIG. 1. In an embodiment, the method 200 is repeated for each packet of a plurality of packets.

At block 210, a packet is received (e.g., from AP 14 or client station 25-1 in FIG. 1). The packet includes a set of one or more flag bits and a MAC header. In one embodiment, the set of flag bits is included within the frame control field 52 of MAC frame 50 in FIG. 2, and/or at a different suitable location within MAC frame 50, or elsewhere in the packet that includes MAC frame 50. The flag bits include ToDS, FromDS, and ViaAP bits, in an embodiment. The MAC header includes at least a first address field specifying a receiver address and a second address field specifying a transmitter address (e.g., address fields 60-1 and 60-2, respectively, in the header of MAC frame 50 in FIG. 2). In an embodiment, the first address field and the second address field contain address information according to the embodiment of Table 4, above.

At block 220, it is determined whether the flag bit(s) indicate that the packet received at block 210 is a multicast packet.

If it is determined at block 220 that the flag bit(s) indicate that the received packet is a multicast packet, flow proceeds to block 230. At block 230, the MAC header of the packet received at block 210, including at least a third address field that contains the MAC multicast address of the packet (e.g., third address field 60-3 in the header of MAC frame 50 in FIG. 2), is processed. In one embodiment, for example, a receiving device implementing the method 200 parses the third address field at block 230 in order to determine the MAC multicast address for one or more purposes (e.g., to confirm that the receiving device is an intended recipient of the packet, etc.). In some embodiments and/or scenarios, the first address field and/or second address field are also processed at block 230.

If it is determined at block 220 that the flag bit(s) indicate that the received packet is not a multicast packet, flow proceeds to block 240. At block 240, the MAC header of the packet received at block 210 is processed, where the processing of the MAC header either includes or does not include processing of a third address field depending on other factors or flag indications. In one embodiment, for example, when the receiving device determines that the packet is not a multicast packet, either two, three or four address fields are processed at block 240 depending on the usage scenario (e.g., according to Table 3 above, in an embodiment).

In one embodiment and scenario in which the second address field of the MAC header of the received packet includes an AID of a STA from which the packet is received, the processing at block 240 includes processing the AID of the STA. In one such embodiment, processing the AID of the STA includes both determining a six-byte MAC address of the STA based on the two-byte AID of the STA, and then calculating a CCMP nonce based on the determined MAC address of the STA. Alternatively, in an embodiment, processing the AID of the STA includes calculating a CCMP nonce based on a receiver MAC address included in the first address field of the MAC header. In yet another embodiment, processing the AID of the STA includes calculating a CCMP nonce based on the AID of the STA augmented by additional bits (e.g., padding bits, a partial BSSID, and/or another suitable set of bits, in various different embodiments).

In some embodiments, the method 200 includes additional blocks not seen in FIG. 4. In some embodiments where the method 200 is used in conjunction with the method 100 of FIG. 3, for example, it is determined whether a transmitting or receiving STA is associated with an AP, in order to determine whether the MAC header of the received packet includes a third address field with a MAC address of the STA. In one such embodiment, this determination is made in a block of the method 200 that is located in the path between blocks 220 and 240, with the outcome being used to determine whether the MAC header of the received packet includes a third address field that can be processed.

In the embodiments of Table 4 and FIG. 4, the third address field 60-3 is always present when the destination address is a multicast/group address, while the fourth address field 60-4 is not utilized for most usage scenarios. In a different embodiment, both the third address field 60-3 and the fourth address field 60-4 are not included in the header of MAC frame 50 for any multicast/group address usage scenarios. Instead, at least one A-MSDU 70 is included in the frame body 56 for multicast packets (e.g., the frame body 56 includes a single A-MSDU 70 with the destination address 72 set to the MAC multicast address, or includes multiple A-MSDUs 70, in various embodiments and/or scenarios). This embodiment is shown in Table 5 below:

TABLE 5

| To DS | From DS | ViaAP | Address 1 | Address 2 | Address 3 | Address 4 |
|---|---|---|---|---|---|---|
| 0 | 0 | 0 | RA = DA | TA = SA (AID) | N/A | N/A |
| 0 | 1 | 0 | RA = DA (MC AID) | TA = BSSID | N/A | N/A |
| 1 | 0 | 0 | RA = BSSID | TA = SA (AID) | N/A | N/A |

In one embodiment, ToDS, FromDS, and ViaAP are the values of bits included in the frame control field 52 of the header of the MAC frame 50, similar to the embodiment of Table 3 above. In other embodiments, the ToDS, FromDS, and/or ViaAP bits are instead included in another suitable field of the MAC header, or another location within the packet but outside of the MAC header. In each of the usage scenarios shown in Table 5, the destination address for the packet containing the MAC frame 50 is a multicast/group address. In some embodiments, the embodiment of Table 5 is combined with the embodiment of Table 3. For example, in one embodiment, ToDS, FromDS, ViaAP and/or other flag bits indicate whether the packet is not a multicast packet, in which case address fields are defined according to the different usage scenarios of Table 3, or is a multicast packet, in which case address fields are defined according to the different usage scenarios of Table 5.

In a STA-to-STAs multicast usage scenario (ToDS/FromDS/ViaAP=000), the first address field 60-1 specifies the destination MAC address, the second address field 60-2 specifies the AID of the transmitting STA (e.g., client station 25-1), and the third address field 60-3 and the fourth address field 60-4 are omitted from the header of the MAC frame 50.

In an AP-to-STAs multicast usage scenario (ToDS/FromDS/ViaAP=010), the first address field 60-1, which would be populated with the multicast AID if such an AID were defined, is instead set to a value that indicates a broadcast frame (e.g., all zeros or all ones), the second address field 60-2 specifies the MAC address (BSSID) of the AP (e.g., AP 14), and the third address field 60-3 and the fourth address field 60-4 are omitted from the header of the MAC frame 50.

In a STA-to-AP multicast usage scenario (ToDS/FromDS/ViaAP=100), the first address field 60-1 specifies the MAC address (BSSID) of the receiving AP (e.g., AP 14), the second address field 60-2 specifies the AID of the transmitting STA (e.g., client station 25-1), and the third address field 60-3 and the fourth address field 60-4 are omitted from header of the MAC frame 50.

While the address field definitions shown in Tables 3-5 address some of the issues discussed earlier that arise from the use of AIDs in MAC header address fields, there remains the issue of how to properly calculate the CCMP nonce. Under the IEEE 802.11 Standard, each CCMP nonce includes a first field with one byte of nonce flags, followed by a second field with six bytes set equal to the second address field 60-2, followed by a third field with a six-byte packet number. In some embodiments of the long range communication protocol, the CCMP nonce is calculated in a similar manner. In the address field definitions shown in Tables 3-5, however, a two-byte AID is still used in the second address field 60-2, in certain usage scenarios, rather than a six-byte MAC address. Various embodiments of the long range communication protocol, each of which may be used in conjunction with one or more of the embodiments of Tables 3-5, handle this issue in different ways. In one embodiment, when the second address field 60-2 is equal to the AID of the transmitting device, the receiving STA uses the AID to search for the MAC address of the transmitting device, and then uses the MAC address of the transmitting device as the second field of the CCMP nonce.

In an alternative embodiment, when the second address field 60-2 is equal to the AID of the transmitting device, a MAC address from the first address field 60-1, with the UC/MC (unicast/multicast) bit set to 1, is used as the second field of the CCMP nonce. In various other alternative embodiments, when the second address field 60-2 is equal to the AID of the transmitting device, the second field of the CCMP nonce is formed as a combination of two or more of 1) the AID of the transmitting device, 2) padding bits, and 3) a partial BSSID/receiver address. In some embodiments, the second field of the CCMP nonce is formed based on a combination of these approaches. In one embodiment, for example, the second field of the CCMP nonce is set equal to four bytes that are either padding bits, or a partial BSSID with the UC/MC bit set equal to 1, followed by two bytes equal to the AID of the transmitting device.

In alternative embodiments, the MAC header does not include AIDs for any of the address fields 60. One such embodiment is shown in Table 6:

field 60-1 specifies the MAC address (BSSID) of the receiving AP (e.g., AP 14), and the second address field 60-2 specifies the MAC address of the transmitting STA (e.g., client station 25-1). In the embodiment of Table 6, the third address field 60-3 is omitted from the MAC header if ToDS/FromDS/ViaAP=100 (such that the MAC header includes only 12 address bytes), but includes the MAC destination address if ToDS/FromDS/ViaAP=101 (such that the MAC header includes only 18 address bytes).

In a relay or mesh network transmission scenario (ToDS/FromDS/ViaAP=111), the first address field 60-1 specifies the MAC address of the receiving mesh STA (e.g., AP 14), the second address field 60-2 specifies the MAC address of the transmitting mesh STA (e.g., an AP other than AP 14), the third address field 60-3 specifies the MAC destination address, and the fourth address field 60-4 specifies the MAC source address.

Thus, in the embodiment of Table 6, the header of the MAC frame 50 can have two, three, or four address fields depending on the usage scenario. As seen in Table 6, however, this embodiment does not utilize a third or fourth address field when aggregation is utilized (e.g., when the

TABLE 6

| To DS | From DS | ViaAP | Address 1 | Address 2 | Address 3 MSDU case | Address 3 A-MSDU case | Address 4 MSDU case | Address 4 A-MSDU case |
|---|---|---|---|---|---|---|---|---|
| 0 | 0 | 0 | RA = DA | TA = SA | N/A | N/A | N/A | N/A |
| 0 | 1 | 0 | RA = DA | TA = BSSID | N/A | N/A | N/A | N/A |
| 0 | 1 | 1 | RA = DA | TA = BSSID | SA | N/A | N/A | N/A |
| 1 | 0 | 0 | RA = BSSID | TA = SA | N/A | N/A | N/A | N/A |
| 1 | 0 | 1 | RA = BSSID | TA = SA | DA | N/A | N/A | N/A |
| 1 | 1 | 1 | RA | TA | DA | N/A | SA | N/A |

In one embodiment, ToDS, FromDS, and ViaAP are the values of bits included in the frame control field 52 of the header of the MAC frame 50, similar to the embodiment shown in Table 3 above. In other embodiments, the ToDS, FromDS, and/or ViaAP bits are instead included in another suitable field of the MAC header, or another location within the packet but outside of the MAC header.

In a STA-to-STA usage scenario (ToDS/FromDS/ViaAP=000), the first address field 60-1 specifies the MAC address of the receiving STA (e.g., client station 25-2), the second address field 60-2 specifies the MAC address of the transmitting STA (e.g., client station 25-1), and the third address field 60-3 and the fourth address field 60-4 are omitted from the header of the MAC frame 50, such that the MAC header includes only 12 address bytes.

In two AP-to-STA usage scenarios (ToDS/FromDS/ViaAP=010 and ToDS/FromDS/ViaAP=011), the first address field 60-1 specifies the MAC address of the receiving STA (e.g., client station 25-1), and the second address field 60-2 specifies the MAC address (BSSID) of the transmitting AP (e.g., AP 14). In the embodiment of Table 6, the third address field 60-3 is omitted from the MAC header if ToDS/FromDS/ViaAP=010 (such that the MAC header includes only 12 address bytes), but includes the MAC source address if ToDS/FromDS/ViaAP=011 (such that the MAC header includes only 18 address bytes).

In two STA-to-AP usage scenarios (ToDS/FromDS/ViaAP=100 and ToDS/FromDS/ViaAP=101), the first address frame body 56 includes A-MSDUs 70), regardless of the usage scenario (e.g., uplink, downlink, etc.). In one embodiment, one or more special combinations of ToDS, FromDS, ViaAP and/or other flag bits are used to indicate to a receiving device that a packet includes A-MSDUs 70 in the MAC frame body 56, and thus does not include a third or fourth address field in the header of the MAC frame 50. In various embodiments, for example, a ToDS/FromDS/ViaAP value of 000 in a packet sent by an AP, and/or a ToDS/FromDS/ViaAP value of 110 in a packet sent to an AP, can be used to indicate that the MAC frame body 56 of a packet includes A-MSDUs 70.

Although the embodiment of Table 6 utilizes longer, six-byte MAC addresses rather than two-byte AIDs, its implementation may result in one or more advantages that may not be obtained when implementing the embodiments of Tables 2-5. For example, the embodiment of Table 6 may allow frame parsing logic to be used that is very similar to frame parsing logic used in systems conforming to the IEEE 802.11 Standard, does not require a special frame format for multicast/group addressed frames or non-associated STAs, and does not require AIDs to be converted to or from MAC addresses.

While the embodiments of Tables 2-6 above serve to reduce the number of bytes of address information in a MAC header, the embodiments described below provide different techniques for reducing the size of a packet containing a MAC frame. In some embodiments, the below techniques are combined with each other, and/or combined with one or more of the embodiments of Tables 2-5 (or FIG. 3 or FIG. 4) above.

Figure 5:
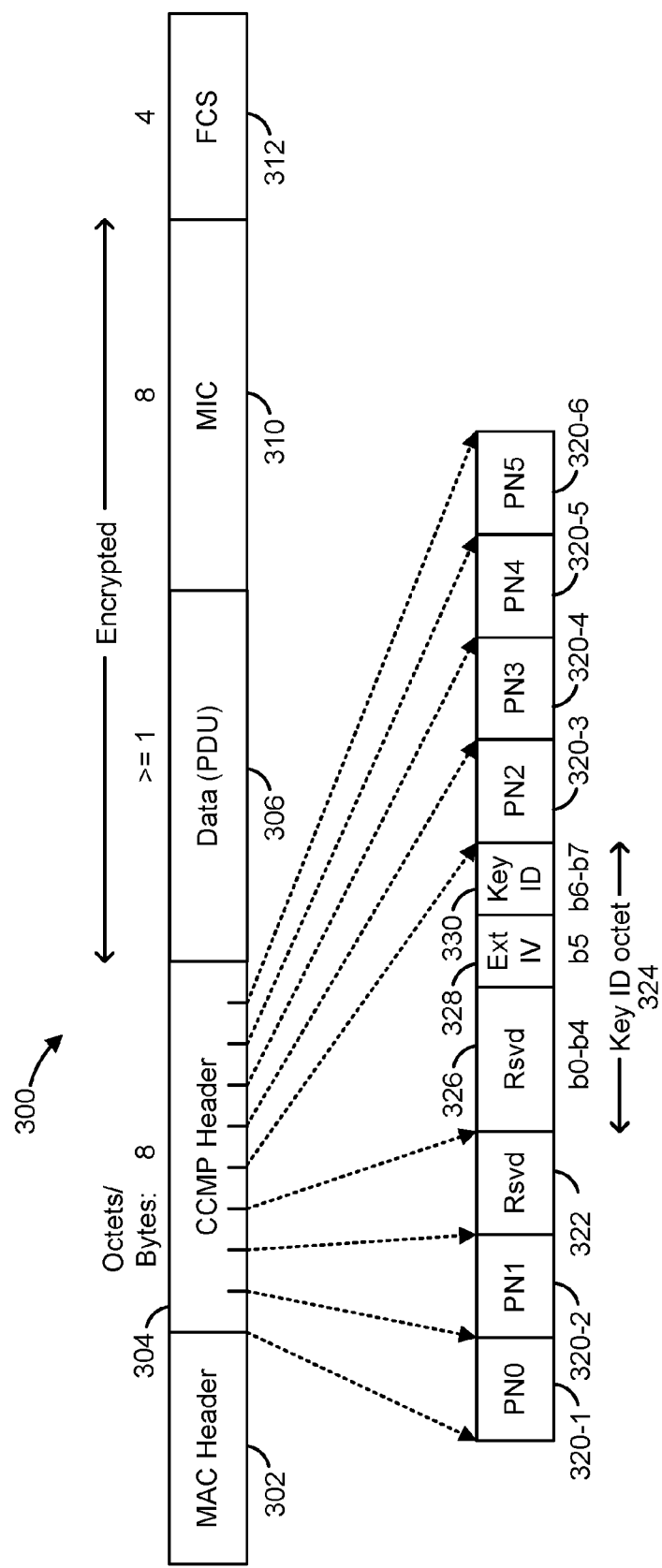
FIG. 5 is a diagram of an IEEE 802.11 encrypted MAC frame.

FIG. 5 is a diagram of an IEEE 802.11 encrypted MAC frame 300. The encrypted MAC frame 300 includes a MAC header 302, a CCMP header 304, a data portion 306, a message integrity code (MIC) 310, and a frame check sequence (FCS) 312. The CCMP header 304 includes six packet number bytes 320-1 through 320-6, a reserved byte 322, and a key ID octet/byte 322. The key ID octet 322 includes a reserved field 326, an Ext IV field 328, and a key ID field 330.

In one embodiment of the long range communication protocol, an encrypted MAC frame similar to the encrypted MAC frame 300 of IEEE 802.11 is utilized. In one embodiment, however, the MIC 310 can optionally be either four bytes or eight bytes (e.g., depending on frame length, and/or depending on whether aggregated MPDUs are utilized for the packet, in various embodiments). In one embodiment, a bit in a service field not shown in FIG. 5 (e.g., a service field following a PHY header and preceding the MAC header 302), a bit in the MAC header 302, or a bit in the CCMP header 304 can indicate whether the MIC 310 is four or eight bytes.

In addition, or alternatively, in various embodiments, the number of packet number bytes 320 is reduced to four bytes or two bytes rather than six bytes. When reduced to two bytes, in one embodiment, the CCMP header 304 carries the third and fourth packet number bytes (PN2 320-3 and PN3 320-4), while the first and second packet number bytes (PN0 320-1 and PN1 320-2) are omitted from the CCMP header 304, with the first and second packet number bytes instead being included in the sequence control field (e.g., sequence control field 54 of FIG. 2).

In some embodiments, a service field (e.g., a service field following a PHY header and preceding the MAC header 302) includes seven scrambler initialization bits, followed by nine reserved bits. In some embodiments, some of the reserved bits are instead used to contain the key ID field 330 of the CCMP header 304 (which allows the CCMP header 304 to be shorter), or are instead used to contain other MAC header fields that are common to all MPDU subframes, such as the two ToDS/FromDS bits (assuming a ViaAP bit is in the MAC header) or four traffic identifier (TID) bits.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

Further aspects of the present invention relate to one or more of the following clauses.

In one embodiment, a method includes receiving, at or from a STA, a plurality of packets. Each packet of the plurality of packets includes (i) a set of one or more flag bits, and (ii) a MAC header. Each MAC header contains at least (i) a first address field specifying a receiver address, and (ii) a second address field specifying a transmitter address. The method also includes determining whether each set of one or more flag bits indicates that the STA was associated with an AP when the respective packet was generated, and processing the MAC header of each packet of the plurality of packets. Processing the MAC header of each packet includes processing a third address field in each packet for which it is determined that the respective set of one or more flag bits indicates that the STA was not associated with an AP when the respective packet was generated. The third address field contains a MAC address of the STA.

In other embodiments, the method includes one or more of the following features.

Determining whether each set of one or more flag bits indicates that the respective packet includes A-MSDUs, where processing the MAC header of each packet does not include processing a third address field in each packet for which it is determined that the respective set of one or more flag bits indicates that the respective packet includes A-MSDUs.

The MAC header of each packet includes the respective set of one or more flag bits.

Receiving a plurality of packets includes receiving the plurality of packets at the STA, and/or processing the MAC header of each packet includes processing an AID of the STA, located in the first address field, in each packet for which it is determined that the respective set of one or more flag bits indicates that the STA was associated with an AP when the respective packet was generated.

Receiving a plurality of packets includes receiving the plurality of packets from the STA, and/or processing the MAC header of each packet includes processing an AID of the STA, located in the second address field, in each packet for which it is determined that the respective set of one or more flag bits indicates that the STA was associated with an AP when the respective packet was generated, and/or where processing the AID of the STA includes determining the MAC address of the STA based on the AID of the STA and calculating a CCMP nonce based on the MAC address of the STA.

Processing the AID of the STA includes calculating a CCMP nonce based on a receiver MAC address included in the first address field.

Processing the AID of the STA includes calculating a counter mode with CCMP nonce based on the AID of the STA augmented by additional bits.

In another embodiment, an apparatus includes a network interface configured to receive, from a STA, a plurality of packets. Each packet of the plurality of packets includes (i) a set of one or more flag bits, and (ii) a MAC header. Each MAC header contains at least (i) a first address field specifying a receiver address, and (ii) a second address field specifying a transmitter address. The network interface is also configured to determine whether each set of one or more flag bits indicates that the STA was associated with an AP when the respective packet was generated, and process the MAC header of each packet of the plurality of packets. The network interface is configured to process the MAC header of each packet at least in part by processing a third address field in each packet for which it is determined that the respective set of one or more flag bits indicates that the STA was not associated with an AP when the respective packet was generated. The third address field contains a MAC address of the STA.

In other embodiments, the apparatus includes one or more of the following features.

The MAC header of each packet includes the respective set of one or more flag bits.

The network interface is configured to process the MAC header of each packet at least in part by processing an AID of the STA, located in the second address field, in each packet for which it is determined that the respective set of one or more flag bits indicates that the STA was associated with an AP when the respective packet was generated.

In another embodiment, a method includes receiving a plurality of packets, wherein each packet of the plurality of packets includes (i) a set of one or more flag bits, and (ii) a MAC header. Each MAC header contains at least (i) a first address field specifying a receiver address, and (ii) a second address field specifying a transmitter address. The method also includes determining whether each set of one or more flag bits indicates that the respective packet is a multicast packet, and processing the MAC header of each packet of the plurality of packets. Processing the MAC header of each packet includes processing a third address field in each packet for which it is determined that the respective set of one or more flag bits indicates that the respective packet is a multicast packet. The third address field contains a MAC multicast address.

In other embodiments, the method includes one or more of the following features.

Receiving a plurality of packets includes receiving one or more packets of the plurality of packets from a STA, and the second address field of the MAC header of each of the one or more packets received from the STA specifies an AID of the STA.

The MAC header of each packet includes the respective set of one or more flag bits.

In another embodiment, an apparatus includes a network interface configured to receive a plurality of packets. Each packet of the plurality of packets includes (i) a set of one or more flag bits, and (ii) a MAC header. Each MAC header contains at least (i) a first address field specifying a receiver address, and (ii) a second address field specifying a transmitter address. The network interface is also configured to determine whether each set of one or more flag bits indicates that the respective packet is a multicast packet, and process the MAC header of each packet of the plurality of packets. The network interface is configured to process the MAC header of each packet at least in part by processing a third address field in each packet for which it is determined that the set of one or more flag bits indicates that the respective packet is a multicast packet. The third address field contains a MAC multicast address.

In other embodiments, the apparatus includes one or more of the following features.

The network interface is configured to receive the plurality of packets at least in part by receiving one or more packets of the plurality of packets from a STA, and the second address field of the MAC header of each of the one or more packets received from the STA specifies an AID of the STA.

The MAC header of each packet includes the respective set of one or more flag bits.

While the present invention has been described with reference to specific examples, which are intended to be illustrative only and not to be limiting of the invention, changes, additions and/or deletions may be made to the disclosed embodiments without departing from the scope of the claims.

What is claimed is:

1. A method, comprising:
receiving, at a wireless network interface device, a packet, wherein
 the packet includes (i) a set of one or more flag bits, and (ii) a medium access control (MAC) header, and
 the MAC header contains at least (i) a first address field specifying a receiver address, and (ii) a second address field specifying a transmitter address;
processing, at the wireless network interface device, the packet to determine whether the packet is a multicast packet;
when the wireless network interface device determines that the packet is a multicast packet, processing, at the wireless network interface device, a third address field in the MAC header containing a MAC multicast address for the packet;
when the wireless network interface device determines that the packet is not a multicast packet, determining, at the wireless network interface device, whether the set of one or more flag bits indicates that a station, being an original source or a final destination of the packet, has an association identifier assigned by an access point;
if the wireless network interface device determines that the station has an association identifier assigned by the access point, determining, at the wireless network interface device, that the packet does not include the third address field; and
if the wireless network interface device determines that the station does not have an association identifier assigned by the access point, determining, at the wireless network interface device, that the packet includes a MAC non-multicast address in the third address field, and processing, at the wireless network interface device, the MAC non-multicast address in the third address field.

2. The method of claim 1, wherein:
the second address field of the MAC header includes an identifier of the station.

3. The method of claim 2, wherein the first address field includes a basic service set identifier (BSSID).

4. The method of claim 2, wherein the first address field is set to a value that indicates a broadcast frame.

5. The method of claim 2, first address field includes a multicast association identifier (AID).

6. The method of claim 1, wherein:
the second address field of the MAC header includes a basic service set identifier (BSSID).

7. The method of claim 6, wherein the first address field is set to a value that indicates a broadcast frame.

8. The method of claim 6, first address field includes a multicast association identifier (AID).

9. An apparatus comprising:
a wireless network interface device having one or more integrated circuits configured to
receive a packet, wherein
  the packet includes (i) a set of one or more flag bits, and (ii) a medium access control (MAC) header, and
  the MAC header contains at least (i) a first address field specifying a receiver address, and (ii) a second address field specifying a transmitter address;
wherein the one or more integrated circuits are further configured to
  process the packet to determine whether the packet is a multicast packet, and
  when the wireless network interface device determines that the packet is a multicast packet, process a third address field in the MAC header containing a MAC multicast address for the packet,
  when the wireless network interface device determines that the packet is not a multicast packet, determine whether the set of one or more flag bits indicates that a station, being an original source or a final destination of the packet, has an association identifier assigned by an access point,
  if the wireless network interface device determines that the station has an association identifier assigned by the access point, determine that the packet does not include the third address field, and
  if the wireless network interface device determines that the station does not have an association identifier assigned by the access point, determine that the packet includes the third address field, and process a MAC non-multicast address in the third address field.

10. The apparatus of claim 9, wherein:
the second address field of the MAC header includes an identifier of the station.

11. The apparatus of claim 10, wherein the first address field includes a basic service set identifier (BSSID).

12. The apparatus of claim 10, wherein the first address field is set to a value that indicates a broadcast frame.

13. The apparatus of claim 10, first address field includes a multicast association identifier (AID).

14. The apparatus of claim 9, wherein:
the second address field of the MAC header includes a basic service set identifier (BSSID).

15. The apparatus of claim 14, wherein the first address field is set to a value that indicates a broadcast frame.

16. The apparatus of claim 14, first address field includes a multicast association identifier (AID).

* * * * *